United States Patent
Cornils et al.

(10) Patent No.: US 6,243,990 B1
(45) Date of Patent: *Jun. 12, 2001

(54) CONNECTING ELEMENT WITH AN EXTRUDED SEAL

(75) Inventors: Gerd Cornils, Merzenich; Rolf Kotte, Alsdorf-Begau; Stefan Ziesen, Heinsberg, all of (DE)

(73) Assignee: Saint-Gobain Vitrage, Courbevoie (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/913,482
(22) PCT Filed: Jan. 22, 1997
(86) PCT No.: PCT/FR97/00118
§ 371 Date: Jun. 15, 1998
§ 102(e) Date: Jun. 15, 1998
(87) PCT Pub. No.: WO97/27081
PCT Pub. Date: Jul. 31, 1997

(30) Foreign Application Priority Data

Jan. 23, 1996 (DE) .............................................. 196 02 245

(51) Int. Cl.[7] ...................................................... E06B 7/16
(52) U.S. Cl. ............................................................ 49/490.1
(58) Field of Search .............................. 49/475.1, 489.1, 49/490.1, 492.1, 493.1

(56) References Cited

U.S. PATENT DOCUMENTS

| 2,620,524 |   | 12/1952 | Bright . |          |
|-----------|---|---------|----------|----------|
| 2,671,935 | * | 3/1954  | Flues    | 49/495.1 |
| 2,679,667 |   | 6/1954  | Angus .  |          |
| 2,968,072 |   | 1/1961  | Bright . |          |
| 5,261,721 |   | 11/1993 | Conger et al. . | |
| 5,336,349 |   | 8/1994  | Cornils et al. . | |
| 5,613,327 | * | 3/1997  | Sauve    | 49/490.1 |

FOREIGN PATENT DOCUMENTS

| 38 33 887 A1 |   | 4/1990 | (DE) . |          |
|--------------|---|--------|--------|----------|
| 0 524 092 A1 |   | 7/1992 | (EP) . |          |
| 655299       | * | 7/1951 | (GB)   | 49/490.1 |
| 1070547      |   | 6/1967 | (GB) . |          |

* cited by examiner

*Primary Examiner*—Jerry Redman
*Assistant Examiner*—C William
(74) *Attorney, Agent, or Firm*—Pennie & Edmonds LLP

(57) ABSTRACT

An assembling element, particularly for vehicle bodywork, is provided with a fastening edge (14) onto which an elastic weatherstrip made from an extrusion-compatible elastomer is extruded. The fastening edge (14) is provided with anchoring notches (17). In a variant, the elastomer of the weatherstrip and the surface of the fastening edge (14) do not form a mutual adhesive joint and the anchoring notches (17) are provided so that the weatherstrip, which is anchored solely mechanically, can be detached if required from the fastening edge (14) and, without further processing, subsequently be refastened mechanically to the fastening edge. In a second variant, the anchoring notches (17) prevent play and make it possible substantially to enhance the connection between the strip and the edge.

16 Claims, 4 Drawing Sheets

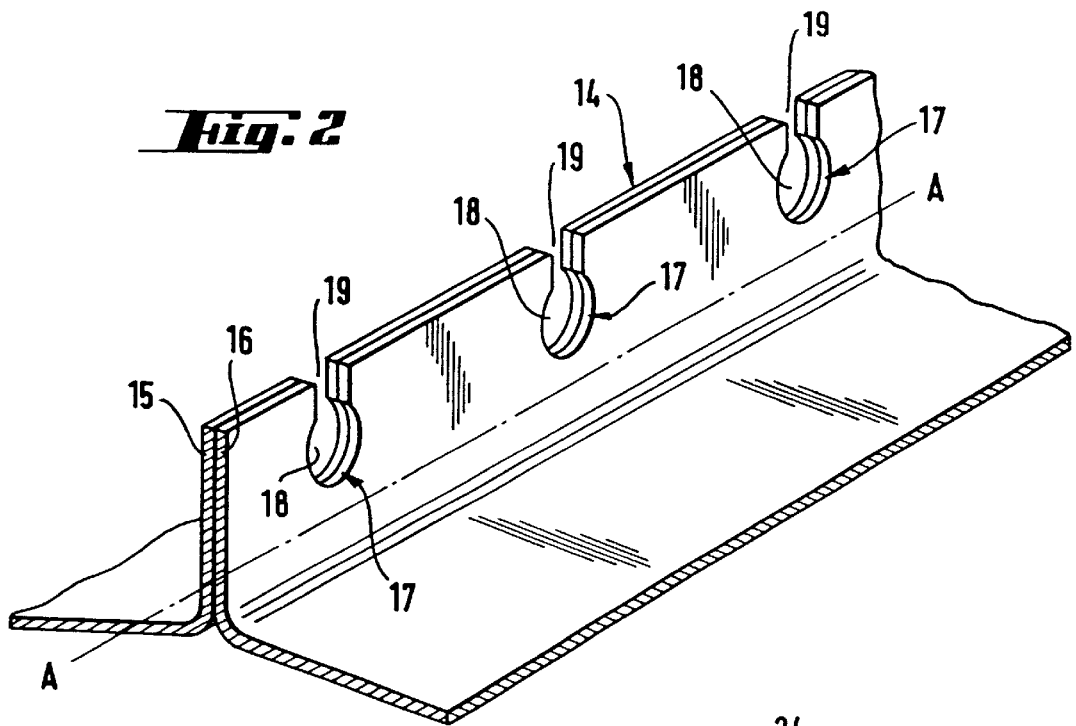
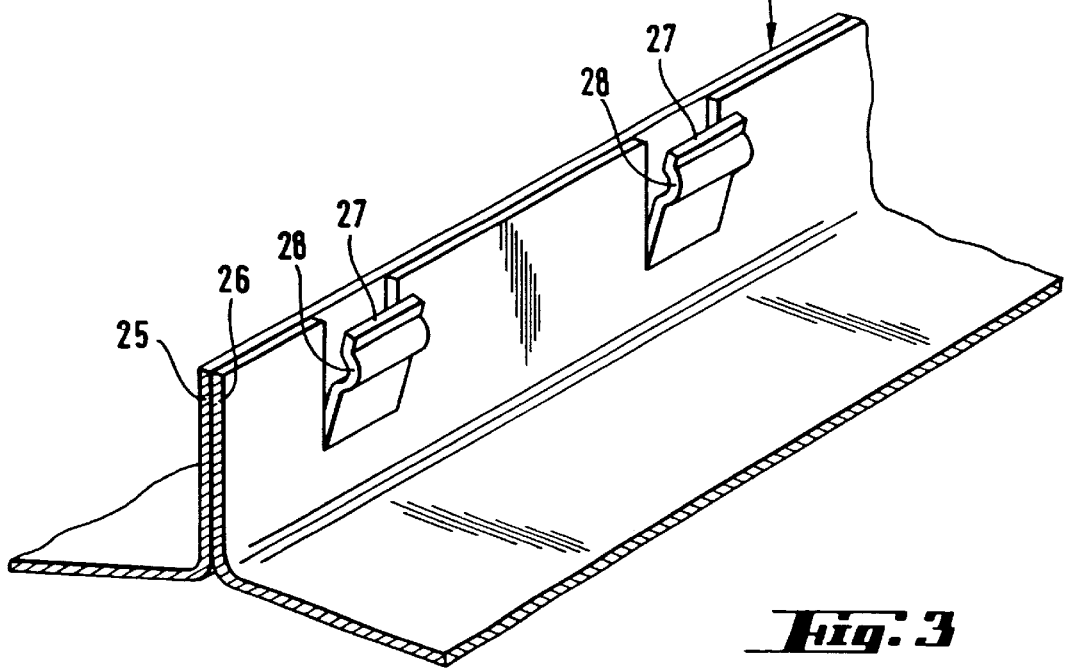

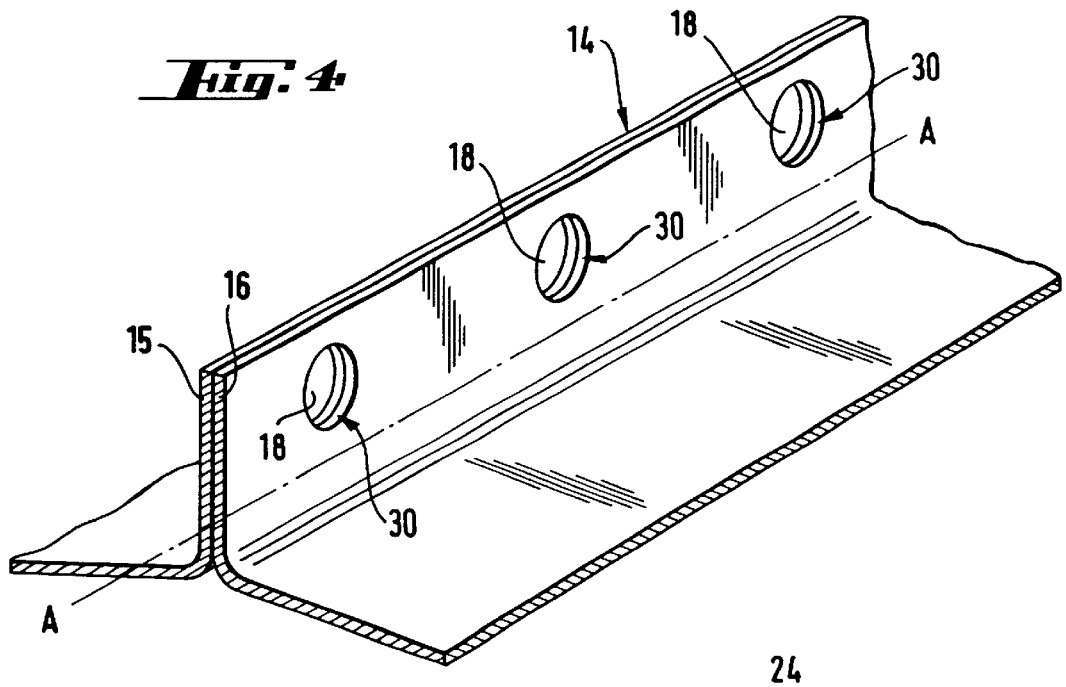
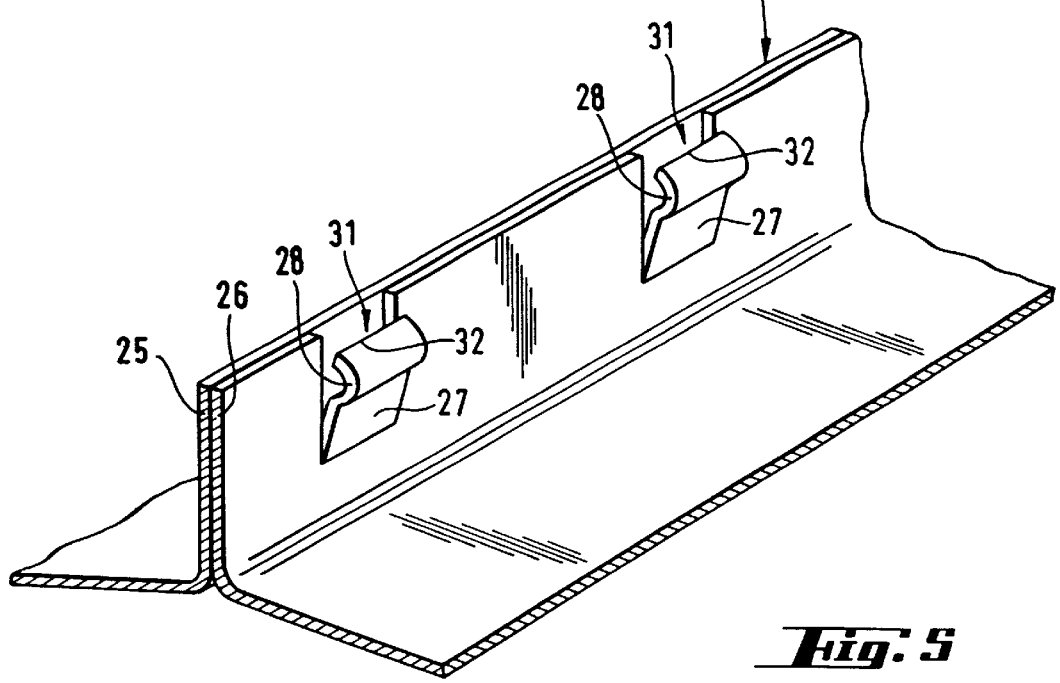

CONNECTING ELEMENT WITH AN EXTRUDED SEAL

FIELD OF THE INVENTION

The present invention relates to an article equipped with an elastomer bead by extrusion in situ and, more particularly, to an assembling element which has a fastening edge onto which the elastomer bead, intended particularly to form a leaktight seal between the article it is equipping and another article with respect to which it is able to move, is fastened.

BACKGROUND OF THE INVENTION

Document EP-A-0,524,092 describes a technique for equipping an article with a profiled bead which is extruded in situ. The bead is made from elastomer and can equip various articles, car windows and diverse car components, such as doors, bonnets or casings, doors or windows or glazing intended for buildings, and also domestic-appliance doors or elements.

In this document, the elastomer bead is fastened to the article by bonding, this being achieved by virtue of the choice of elastomer and the treatment given to the surface of the article.

In the case of car-bodywork elements, extrusion of the elastic rubber leaktight seal directly onto the bodywork element, particularly onto a door, is known from document DE 3,833,887 A1. Extrusion is carried out by a programme-controlled automatic manipulator, the process conditions, in this case also, being chosen so that durable bonding is obtained between the extruded leaktight seal and the bodywork element.

When the leaktight seal is bonded permanently to the bodywork element, it has to be torn off when it impedes a repair which has become necessary. After the repair has been carried out, a new leaktight seal must firstly be extruded in a repeat extrusion operation. In the repair workshops where repairs are carried out, the devices required for this operation are, however, generally unavailable, so the subsequent extrusion of weatherstrips is not trouble-free.

A first object of the invention is to prepare an assembling element which includes an extruded leaktight seal which, if necessary, may be removed simply from the assembling element and later be reused on this same element.

Moreover, when bonded elastomer seals are stressed by tearing-away under particularly rough conditions or when, owing to the nature of the substrate, for example, the bond may prove insufficient, it is necessary to improve the attachment of the seal to its support.

SUMMARY OF THE INVENTION

To achieve its objects, the invention proposes an assembling element equipped with an elastomer bead by extrusion in situ on a fastening edge of the element in which the fastening edge is provided with anchoring notches or anchoring projections, the elastomer material having penetrated into intimate contact with the said notches or projections.

In a first variant, the elastomer and the fastening edge do not form an adhesive joint and the anchoring notches or projections have a re-entrant angle which is limited so as to produce a solely mechanical anchoring which enables the elastomer bead to be detached from the fastening edge and to be subsequently refastened.

In a second variant, the anchoring notches or the anchoring projections have a re-entrant angle such that the elastomer bead cannot be detached from the fastening edge without damage.

The characteristics of the invention thus make it possible to continue with the economic process of extruding weatherstrips and simultaneously to avoid the drawbacks hitherto associated with this process since, on the one hand, they may, if necessary, be detached from the bodywork element and subsequently reused. This is made possible by the fact that the adhesive joint which was produced hitherto during extrusion is replaced by a suitable mechanical joint. Although, in the case of the invention in its final form, this is a press-in weatherstrip, it is substantially without the drawbacks which are linked to known press-in strips. In particular, it is ideally suited to the shape of the fastening edge and therefore guarantees a complete seal against water infiltration between the weatherstrip and the fastening edge. On the other hand, in the second variant of the invention, the use of a reinforced assembling technique makes it possible to ensure that, even under the most difficult conditions of use, the bead can never be torn away from the assembling element.

In the first variant, to avoid bonding the strip to the fastening edge, the elastomer used for the extrusion operation and/or the surface of the fastening edge must be of such a nature that they do not bond to each other. This may be achieved, for example, through the choice of a suitable elastomer which does not adhere, without further processing, to the surface of the fastening edge. Adhesion may also be prevented by suitably treating the surface of the fastening edge, for example by depositing a suitable separating agent. The notches and/or the projections producing mechanical anchoring on the fastening edge may be formed, in principle, in any way, provided they allow the weatherstrip moulding to be detached mechanically and reinserted. In the second variant, by contrast, the conditions for satisfactory adhesion may advantageously be set up, it being possible, in fact, for adhesion to be combined with mechanical attachment to ensure fail-safe assembling. Moreover, continuous adhesion guarantees a satisfactory seal.

In all cases, during extrusion of the elastomer forming the weatherstrip, the extrusion die and the fastening edge must be formed in such a manner that the eroded hollows which are formed by the anchoring projections or the anchoring notches are filled during the extrusion operation.

BRIEF DESCRIPTION OF THE DRAWINGS

The invention will be described in greater detail hereinbelow on the basis of the appended drawings.

In the appended drawings, FIG. 1 relates to the two variants of the invention, FIGS. 2 and 3 relate to the first variant and FIGS. 4 and 5 relate to the second variant. More precisely:

FIGS. 2 and 2B show a first embodiment of a fastening edge with the special features of the first variant of the invention;

FIG. 3 shows a further embodiment of a fastening edge in which it is possible to dismantle the seal;

FIG. 4 shows the fastening edge in the case of the second variant of the invention; and FIG. 5 shows a further embodiment.

DETAILED DESCRIPTION OF THE INVENTION

Figure 1:
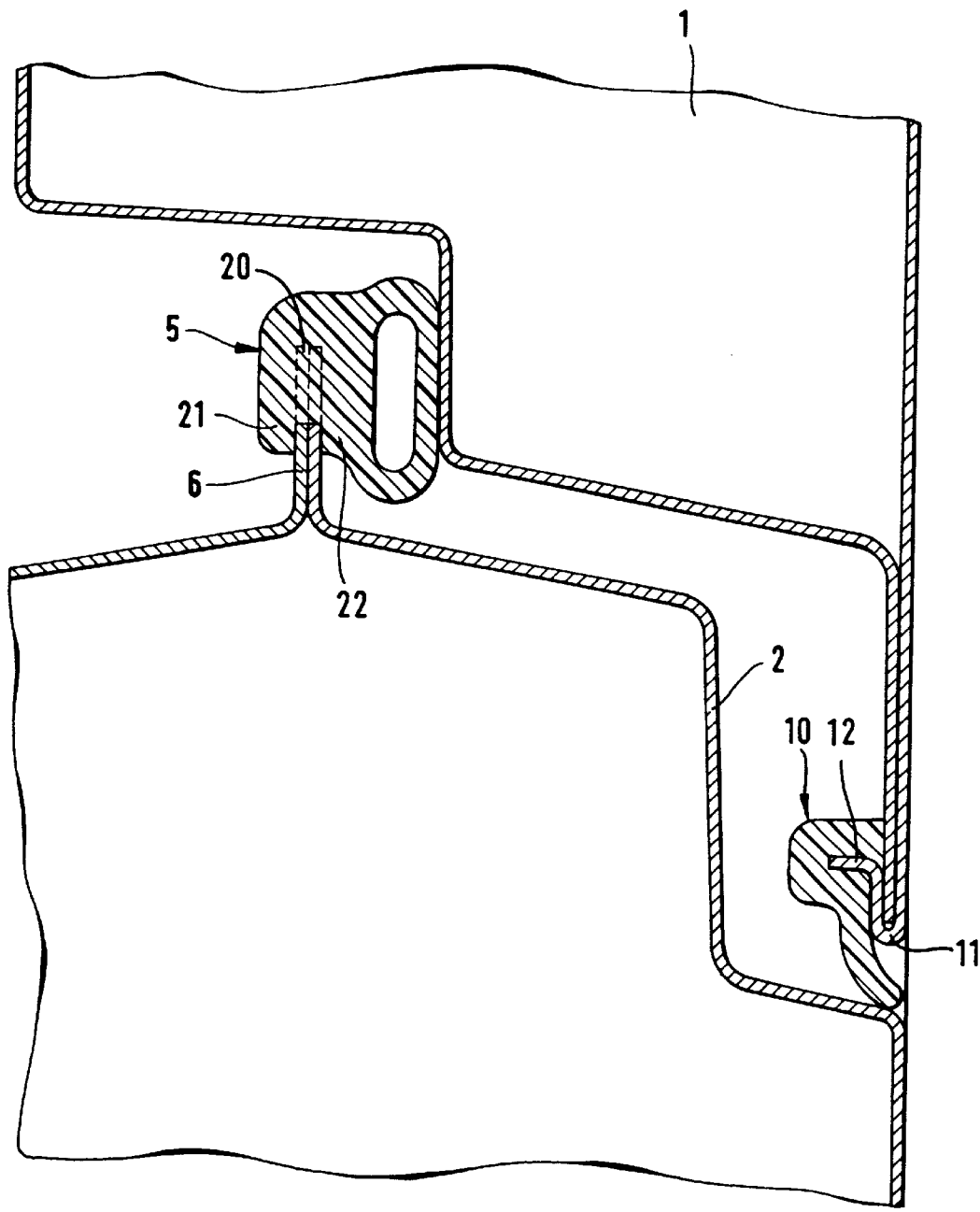
FIG. 1 is a vertical sectional view showing the transition area between a vehicle door and the substructure including extruded leaktight seals.

In the drawing of FIG. 1, the invention is shown being used for door leaktight seals, but it is naturally not limited to this application. In principle, it may be used, with the same advantage, for boot lids, bonnets and other movable bodywork elements and also in other fields in which extruded weatherstrips are used, such as in construction or in domestic appliances.

FIG. 1 shows the lower section of a car door 1 and the substructure 2 of the floor of the vehicle, which interacts with the door 1. The seal between the door and the substructure is provided by the two weatherstrips 5 and 10. The weatherstrip 5 has been produced by direct extrusion of an elastomer on the fastening edge 6 of the substructure 2 and the weatherstrip 10 by direct extrusion of the elastomer on the rim 11 of the door and on the fastening edge 12.

The processes and devices for extruding elastomer strips onto articles are, in principle, known. A device for extruding an elastomer strip onto a window, as may also be used in the present case, is described, for example, in document EP 0,524,092 B1.

With known processes and devices, it is also possible to extrude profiled mouldings which include a tubular leaktight section, such as those used, for example, for the weatherstrip 5.

Thermoplastic elastomers have proved their worth in the manufacture of extruded weatherstrips, particularly thermoplastic polyolefin elastomers consisting of isotactic polypropylene and ethylene-propylene-diene rubber, for example products available commercially as SANTOPRENE. These thermoplastic elastomers have a working temperature of from 180 to 230° C., so the extruder as well as the extrusion die and the connection hose between the extruder and the extrusion die have to be heated similarly. The elastomers produced on this basis, however, also possess the feature that they adhere well to the substrate onto which they are extruded only when the surface of this substrate is treated using a suitable adhesive agent. This poor adhesion is advantageous in the case of the first variant of the process of the invention. However, as appropriate, it may be advantageous, completely to prevent any adhesion, to treat the surface of the substrate using a suitable separating agent, for example using a silicone-containing solution.

The anchoring projections or the anchoring notches required, provided in the fastening edges, may be produced in different ways. It is therefore, for example, possible to provide, in the fastening edge, in the longitudinal direction, a groove with points of erosion, a moulding or a fold, the cross section of which is on each occasion formed in such a manner that, on the one hand, the anchoring function is fulfilled and, on the other hand, removal of the weatherstrip and its reinsertion are possible.

Figure 2B:
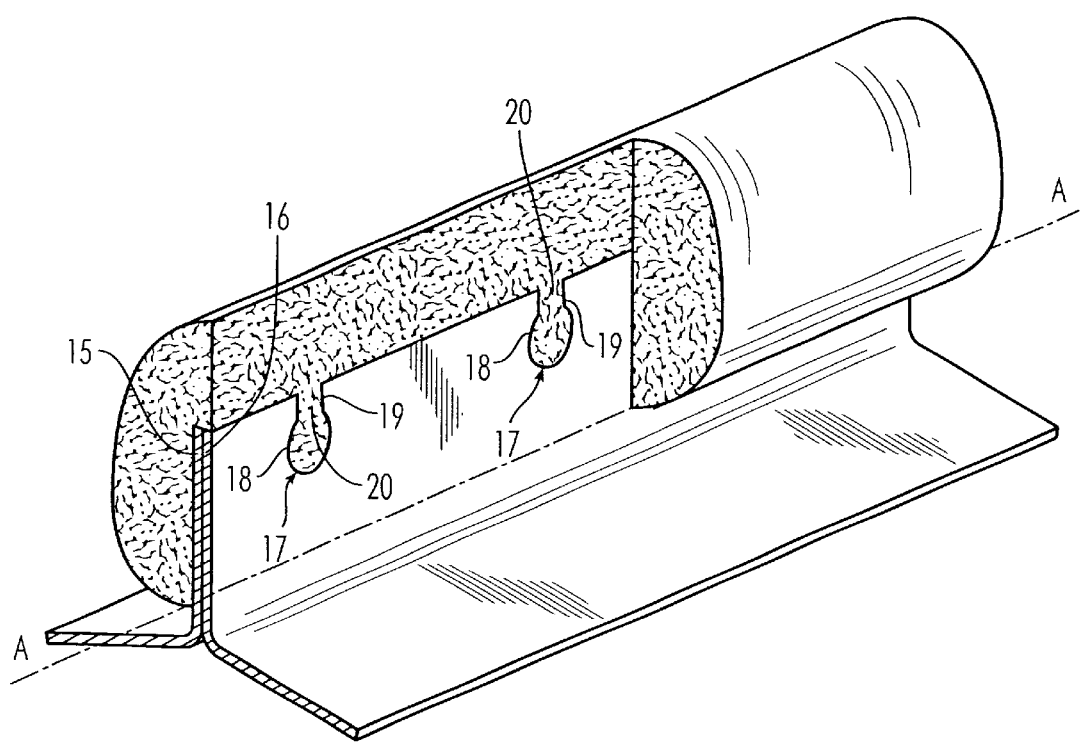

Embodiments which are suitable for the configuration of the fastening edge are shown in FIGS. 2, 2B, and 3. The figures show the fastening edges 14 and 24, which correspond to the fastening edge 6 in FIG. 1. The fastening edge 14, which is formed by the two sheet-metal bands 15, 16, folded over and welded to each other, is provided on its upper rim with notches 17 which are, for example, produced by die stamping. The notches 17 consist, in the case shown, of an opening 18, which is, for example, round, and a cut 19 which connects the opening 18 to the upper side of the fastening edge. During extrusion of the weatherstrip, the fastening edge is covered over by the elastomer beyond the openings 18, virtually as far as the line A—A. The highly viscous elastomer therefore penetrates into the openings 18 and into the cuts 19. As soon as the extruded material has cured, the profiled bead thus formed may be removed from the fastening edge and subsequently be refastened onto the fastening edge, and the linking small bars 20 formed during extrusion inside the openings 18 and the cuts 19 are then reinserted into the corresponding notches 17 between the two wings 21 and 22 of the weatherstrip 5 as shown in FIGS. 1 and 2B.

In the case of the embodiment shown in FIG. 3, the fastening edge 24 is again formed from two folded sheet-metal bands 25 and 26. In this case, the notches required for mechanical anchoring are formed by the fact that, in the sheet-metal bands 26, at distances of, for example, from 5 to 20 cm, small sheet-metal segments 27 on the rim are bent and folded outwards in the form of snouts using a suitable die-stamping tool. These sheet-metal segments 27 are provided, in the same die-stamping operation, with a moulding 28 which forms, on each occasion, anchoring projections for the elastomer material both on the inside, i.e. on the inside of the housing formed by the folded sheet-metal segment 27 and the sheet-metal band 25, and on the outside of the sheet-metal segments 27.

In FIG. 4, it is possible to see the configuration which it is suitable, for example, to give to the fastening edge in order to enhance anchoring of the strip. With a design of this type, the material of the elastomer, which is fluid when used, penetrates into the holes 18 of the anchoring notches 30 and, after curing, it becomes impossible to remove the bead without tearing it away, breaking the joint between the area included in the cavities 18 and the rest of the bead.

Similarly, in FIG. 5, because the ends 32 of the sheet-metal segments 27 of the anchoring projections 31 have been closed, they virtually come into contact with the fastening edge 24 and prevent bead play—its removal damages it.

These two examples of an end re-entrant angle demonstrate that, by virtue of the configuration given to the amounts of erosion of the fastening edge, it is possible substantially to strengthen the joint between the bead and its support, which is advantageous every time the bead is likely to be manipulated roughly.

These, therefore, are the two variants of the invention and both of them, one permitting removal and then refitting of an elastomer bead and the other strengthening its attachment to its support, contribute to optimizing the joint between a seal extruded in situ and its support.

The fields of application of the invention are the same as those of the technique set forth in document EP-A-0,524,092.

What is claimed is:

1. Assembling element comprising an elastomer bead and a fastening edge, said elastomer bead formed of an elastomer material by extrusion on the fastening edge of the element such that said elastomer bead has an interior surface for contacting the fastening edge, the fastening edge (6, 12, 14, 24) being provided with anchoring surfaces defined by one of notches (17, 30) and projections (27, 28), wherein said interior surface of the elastomer bead is in substantially intimate contact along its entire surface area with said fastening edge and said anchoring surfaces, said elastomer material and the fastening edge (6, 12, 14, 24) form a non-adhesive joint, and the anchoring surfaces have a re-entrant angle which is configured so as to produce a solely mechanical anchoring which enables the elastomer bead (5, 10) to be detached from the fastening edge (6, 12, 14, 24) and to be subsequently refastened.

2. Assembling element according to claim 1, characterized in that the anchoring surfaces are defined by notches (17) in the fastening edge (14), said notches consisting of edge cuts (19) which open out into substantially circular openings (18) into which linking small bars (20) of the elastomer material are formed during said extrusion between wings (21, 22) disposed on opposite sides of the elastomer bead (5).

3. Assembling element according to claim 1, characterized in that the anchoring surfaces are defined by projections consisting of bent sheet-metal segments (27) provided with mouldings (28).

4. Assembling element according to claim 1, characterized in that the anchoring surfaces have a re-entrant angle such that the elastomer bead (5, 10) cannot be detached from the fastening edge (6, 12, 14, 24) without damage to said elastomer bead.

5. Assembling element according to claim 4, characterized in that the anchoring surfaces are defined by notches (30) forming enclosed openings (18) in said fastening edge (14).

6. Assembling element comprising an elastomer bead and a fastening edge, said elastomer bead formed of an elastomer material by in situ extrusion on the fastening edge of the element such that said elastomer bead was an interior surface for contacting the fastening edge, the fastening edge (6, 12, 14, 24) being provided with anchoring surfaces defined by one of notches (17, 30) and projections (27, 28), wherein said interior surface of the elastomer bead is in substantially intimate contact along its entire surface area with said fastening edge and said anchoring surfaces, wherein
   the anchoring surfaces are defined by projections (31) extending away from said fastening edge (24), each projection having an end extending back toward said fastening edge (24) and substantially into a plane defined by said fastening edge (24) and wherein the anchoring surfaces have a re-entrant angle such that the elastomer bead (5, 10) cannot be detached from the fastening edge (6, 12, 14, 24) without damage to said elastomer bead.

7. In an assembling element equipped with an elastomer bead by extrusion on a fastening edge of the element, said fastening edge including anchoring surfaces (17, 30, 27, 28) extending in a fir;t direction disposed at an angle to a second direction along which said elastomer bead can be moved to remove said bead from said fasting edge and to reattach said bead to the fastening edge without damage to said elastomer bead, said fastening edge and anchoring surfaces together defining an exterior surface and said elastomer bead defining an interior surface, wherein said interior surface of said elastomer bead is in substantially intimate contact and is mechanically anchored along its entire interior surface area with said exterior surface defined by said fastening edge and said anchoring surfaces.

8. A sealing assembly comprising:
   a fastening edge having at least one anchoring surface defined thereon, said anchoring surface including one of a notch or a projection, said fastening edge and anchoring surface together defining an exterior surface; and
   an extruded elastomoic material having an interior surface positioned on the fastening edge, said elastomeric material being in substantially intimate contact and being mechanically anchored along its entire interior surface area with said at least one anchoring surface and the fastening edge,
   wherein said fastening edge is configured to enable the extruded elastomeric material to be detached from the fastening edge without damage to the damage to the elastomeric material and to be subsequently reattached.

9. The sealing assembly of claim 8, wherein said elastomeric material and said fastening edge together form a non-adhesive joint and said at least one anchoring surface extends in a first direction which is disposed at an angle to a second direction along which said elastomeric material can be detached from and reattached to said fastening edge.

10. The sealing assembly of claim 9, wherein said elastomeric material forms an elastomeric bead during extrusion and said at least one anchoring surface is a notch on the fastening edge, with each said notch being defined by an edge cut which is connected to an opening, and said elastomeric bead extends in the first direction through said notch and may be detached from and reattached to said fastening edge by movement in the second direction.

11. The sealing assembly of claim 10, wherein said elastomeric bead defines linking bars in each said notch between wings of elastomeric material disposed on opposite sides of the elastomeric bead.

12. The sealing assembly of claim 8, wherein said at least one anchoring surface is configured such that the elastomeric material cannot be detached from the fastening edge without damaging said elastomeric material.

13. The sealing assembly of claim 12, wherein the at least one anchoring surface is a notch forming an enclosed opening in said fastening edge.

14. A sealing assembly comprising:
   a fastening edge having at least one anchoring surface defined thereon, said anchoring surface including one of a notch or a projection said fastening edge and anchoring surface together defining an exterior surface; and
   an in situ extruded elastomeric material having an interior surface positioned on the fastening edge, said elastomeric material being in substantially intimate contact along its entire interior surface area with said at least one anchoring surface and the fastening edge,
   wherein said at least one anchoring surface is a projection extending from the fastening edge, said projection having a bent portion which allows the elastomeric material to be detached from and reattached to said fastening edge without damaging said elastomeric material, and
   wherein the elastomeric material and said fastening edge together form a non-adhesive joint and said at least one anchoring surface extends in a first direction which is disposed at an angle to a second direction along which said elastomeric material can be detached from and reattached to said fastening edge.

15. A sealing assembly comprising:
   a fastening edge having at least one anchoring surface defined thereon, said anchoring surface including one of a notch or a projection, said fastening edge and anchoring surface together defining an exterior surface; and
   an in situ extruded elastomeric material having an interior surface positioned on the fastening edge, said elastomeric material being in substantially intimate contact along its entire interior surface area with said at least one anchoring surface and the fastening edge,
   wherein the at least one anchoring surface is a projection from said fastening edge extending away from said fastening edge, with each projection having defined at an end thereof an extension extending back toward said fastening edge, and wherein said at least one anchoring surface is configured such that the elastomeric material cannot be detached from the fastening edge without damaging said elastomeric material.

16. An assembling element comprising an elastomer bead directly extruded by extrusion on a fastening edge of the assembling element, wherein the fastening edge (6, 12, 14, 24) is provided with anchoring surfaces defined by one of notches (17, 30) and projections (27, 28), with the elastomer material of said elastomer bead being in intimate contact with and embedded in said anchoring surfaces, wherein the anchoring surfaces have a re-entrant angle which is configured so as to produce a mechanical anchoring that enables the elastomer bead to be detached from the fastening edge and to be subsequently reattached.

* * * * *

UNITED STATES PATENT AND TRADEMARK OFFICE
CERTIFICATE OF CORRECTION

PATENT NO. : 6,243,990 B1
DATED : June 12, 2001
INVENTOR(S) : Gerd Cornils, Rolf Kotte, and Stefan Ziesen It is certified that error appears in the above-identified patent and that said Letters Patent is hereby corrected as shown below:

Claim 7,
Line 4, replace the term "fir;t" with the word -- first --.

Claim 8,
Line 7, replace term "elastomoic" with the word -- elastomeric --.
Line 15, delete the first occurrence of "damage to the".

Claim 14,
Line 3, insert a -- , -- after the word "projection".

Signed and Sealed this

Thirtieth Day of October, 2001

*Attest:*

NICHOLAS P. GODICI
*Attesting Officer*     Acting Director of the United States Patent and Trademark Office